(12) United States Patent
Kane et al.

(10) Patent No.: US 8,069,876 B2
(45) Date of Patent: Dec. 6, 2011

(54) SEALING BUSH, HYDRAULIC UNIT, AND CHECK VALVE

(75) Inventors: Brian Kane, Lohr (DE); Bernd Schmitt, Rechtenbach (DE)

(73) Assignee: Bosch Rexroth AG, Stuttgart (DE)

( * ) Notice: Subject to any disclaimer, the term of this patent is extended or adjusted under 35 U.S.C. 154(b) by 300 days.

(21) Appl. No.: 11/662,576

(22) PCT Filed: Sep. 16, 2005

(86) PCT No.: PCT/DE2005/001630
§ 371 (c)(1),
(2), (4) Date: May 7, 2007

(87) PCT Pub. No.: WO2006/029614
PCT Pub. Date: Mar. 23, 2006

(65) Prior Publication Data
US 2008/0191428 A1    Aug. 14, 2008

(30) Foreign Application Priority Data
Sep. 17, 2004  (DE) .......................... 10 2004 045 582
Dec. 2, 2004  (DE) .......................... 10 2004 058 302

(51) Int. Cl.
*F16L 47/00*  (2006.01)
*F16K 15/02*  (2006.01)
(52) U.S. Cl. .................... 137/538; 285/332.2; 285/238; 277/626
(58) Field of Classification Search ............... 137/540, 137/538, 515, 543.21, 543.17; 251/337; 277/650, 628, 626; 138/44, 40; 285/354, 285/238, 332.2
See application file for complete search history.

(56) References Cited

U.S. PATENT DOCUMENTS

| 2,143,399 | A | * | 1/1939 | Abercrombie | 137/540 |
| 2,745,432 | A | * | 5/1956 | Williams | 137/540 |
| 3,099,999 | A | * | 8/1963 | Vismara | 137/543.23 |
| 4,054,157 | A | * | 10/1977 | Moseley, Jr. | 138/42 |
| 4,667,700 | A | * | 5/1987 | Buzzi | 138/45 |
| 5,058,859 | A | * | 10/1991 | Chen | 251/149.4 |
| 5,503,438 | A | * | 4/1996 | Swauger | 285/332.2 |
| 7,008,195 | B2 | * | 3/2006 | McGrath et al. | 417/417 |
| 7,070,187 | B2 | * | 7/2006 | Boeve | 277/598 |

FOREIGN PATENT DOCUMENTS

DE   1 900 352    9/1969
DE   33 33 086 A1   3/1985

(Continued)

OTHER PUBLICATIONS

"Check Valve Cartridge Type M-SR, Series 1X", RE 20 395/12.95, Dec. 1995, Mannesmann Rexroth.
"Check Valve Sandwich Plate Type Z1S, Series 1X", RE 21 523/10. 95, Oct. 1995, Mannesmann Rexroth.
Japanese Office Action issued in Japanese Patent Application No. 2007-531591 (with translation).

(Continued)

*Primary Examiner* — John Rivell
*Assistant Examiner* — Macade Brown
(74) *Attorney, Agent, or Firm* — Oliff & Berridge, PLC

(57) ABSTRACT

There is disclosed a sealing bush as well as a hydraulic unit fitted with the sealing bush and a check valve. The sealing bush is made of plastic and has, on an end face, a preferably conical elevation that can be brought into sealing contact with a bearing shoulder.

11 Claims, 3 Drawing Sheets

FOREIGN PATENT DOCUMENTS

| | | |
|---|---|---|
| DE | 43 01 004 A1 | 7/1994 |
| DE | 197 39 904 A1 | 3/1999 |
| DE | 103 16 230 A1 | 9/2004 |
| EP | 0 268 520 A2 | 5/1988 |
| JP | A-2001-504931 | 4/2001 |
| JP | A-2005-188652 | 7/2005 |

* cited by examiner

SEALING BUSH, HYDRAULIC UNIT, AND CHECK VALVE

The invention relates to a sealing bush according to the preamble of claim 1 as well as to a hydraulic unit fitted with such sealing bush and to a check valve.

In the data sheets RD 20 395/12.95 and RD 21 523/10.95 of the applicant check valves are disclosed in which a metallic locking member is biased against a valve seat via a spring. Said spring is supported at the rear on a sealing bush inserted in a hydraulic fluid flow passage of a plate receiving the check valve or of a housing. In the known solution said sealing bush is equally made of metal and carries a sealing ring by which leakage along the outer circumference of the sealing bush is prevented.

Such sealing bush is relatively expensive in manufacture, because it has to be machined of metal and the sealing ring is mounted on the outer circumference as a separate component part.

The object underlying the invention is to provide a sealing bush as well as a hydraulic unit fitted with such sealing bush and a check valve in which the expenditure of manufacturing the sealing bush is reduced vis-à-vis the known solution while the sealing effect is good.

This object is achieved, with regards the sealing bush, by the features of claim 1, and with regards to the check valve, by the features of claim 9.

In accordance with the invention, the sealing bush is made of plastic, for instance by injection molding, so that with a suitable choice of the material a very simple and precise manufacture is possible. On a rear end face of the sealing bush an elevation is formed which can be brought into contact with a shoulder of a hydraulic fluid flow passage receiving the sealing bush. I.e. according to the invention the sealing means are integrated in the sealing bush such that no separate component part, for instance an O-ring, must be mounted and the assembling effort is thus reduced.

In a preferred embodiment the elevation is formed in the area of the inner circumference of the sealing bush and shallows toward the outer circumference in the front face. It is especially preferred when the elevation is frusto-conical, said cone frustum ascending toward the inner circumference.

It turned out that the sealing effect with a conical angle is optimum in the range of from 8° to 10°.

In an especially preferred embodiment the elevation extends in radial direction approximately over one third of the annular front face of the sealing bush.

For a further improvement of the sealing, on the front face in the area between the outer circumference and the elevation an additional circumferential sealing rib may be provided the height or axial extension of which corresponds to that of the elevation.

In the solution according to the invention the sealing is preferably performed in the area of the outer circumference of the sealing bush by means of an integrated sealing lip which is formed by a recess provided in the area of a front end face of the sealing bush. Said recess becomes deeper toward the rear end face.

For further improving the sealing and for compensating for shrinks at least one further annular groove can be provided at the outer circumference of the sealing bush at an axial distance from the recess.

The pressing of the sealing bush in axial direction and radial direction to the contacting surfaces of the hydraulic fluid flow passage is optimized when the inner circumferential wall is formed conically in the area of the front end face so that the compressive forces act in the axial and radial directions in a defined manner.

On principle, the sealing bush according to the invention can be used in any hydraulic units, wherein a hydraulic fluid flow passage in which the sealing bush is inserted is formed in a plate or housing.

The sealing bush is supported either along its elevation on a circumferential edge of a counter-plate or on a shoulder so that the circumferential edge is adjacent in the area of the elevation. An additional sealing ring 61 is shown in FIGS. 2 and 5 and can be supported in the area between the elevation and the sealing rib. The counter-plate may be provided with a bore for supporting the sealing ring.

In such a hydraulic unit it is preferred when the sealing bush is inserted with oversize both in axial direction and in radial direction.

The sealing bush can be inserted especially advantageously in a check valve in which a locking member is biased against a valve seat via a spring, wherein said spring is supported on the front end face of the sealing bush. It is preferred in this case when the locking member is likewise made of plastic so that, on the one hand, the moved masses of the check valve are minimal and, on the other hand, the wear occurring when the locking cone impinges on the sealing bush is reduced.

Other advantageous developments of the invention are the subject matter of further subclaims.

Hereinafter preferred embodiments of the invention are illustrated in detail by way of schematic drawings, in which.

Figure 1:
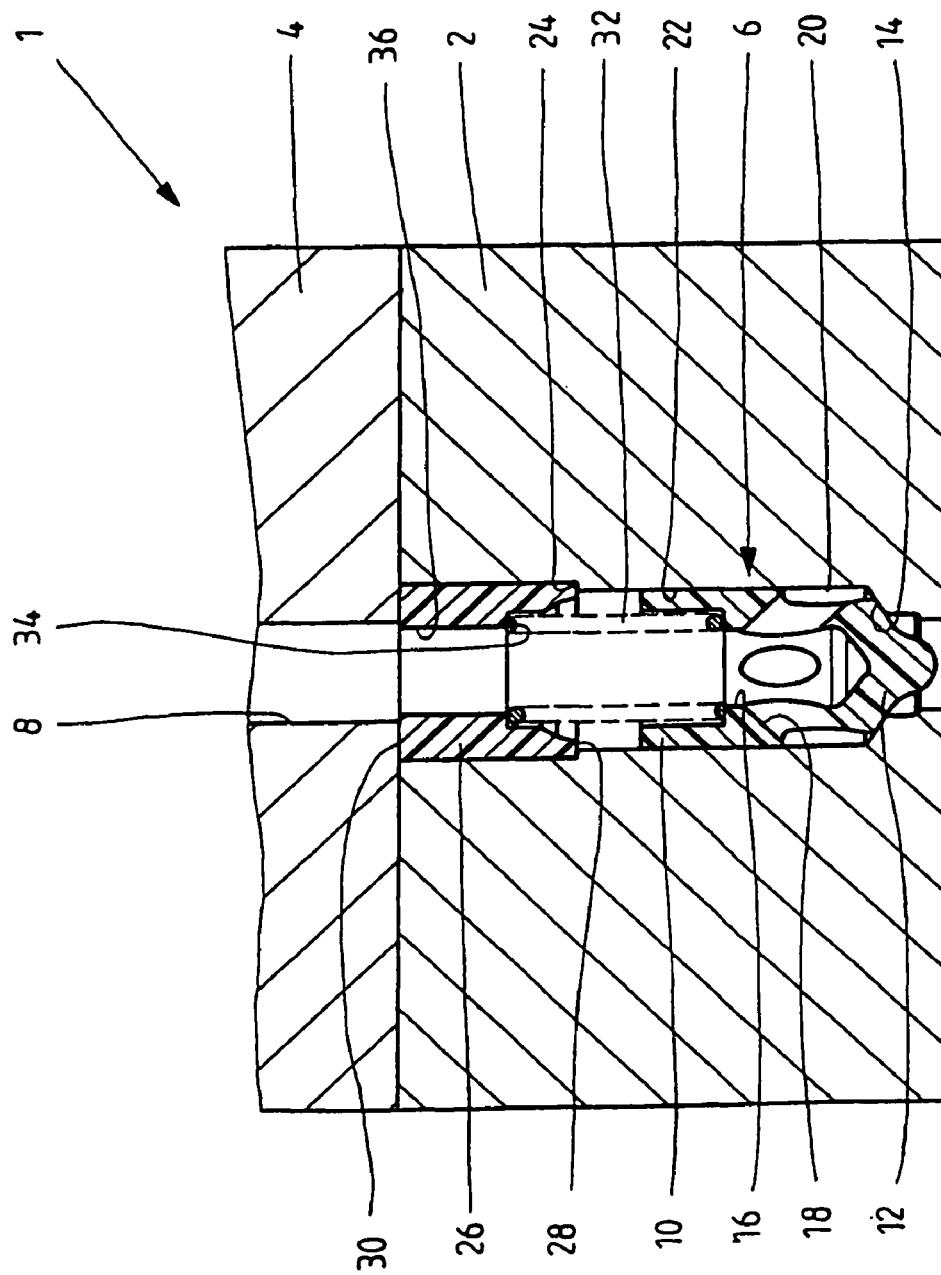
FIG. 1 shows a cut partial section of a hydraulic unit designed to include a check valve.

FIG. 1 shows a cut sectional representation of a hydraulic unit, for instance a mobile control block 1 designed in large-panel construction and including a plate 2 to which a counter-plate 4 is assigned. In the plate 2 a check valve 6 is inserted which in its shown locked position blocks the hydraulic fluid flow path between an inlet port A and an outlet passage 8 formed in the counter-plate 4 and in the open position controls said connection to open.

The check valve 6 includes a locking member 10 which is biased against an appropriately formed valve seat 14 by a cone 12. The locking member 10 is a hollow piston, wherein an internal bore 16 opens via inclined passages 18 in an annular chamber 20 formed by a plurality of pockets at the outer circumference of the locking member 10, one of the respective inclined bores 18 opening into a pocket. The basic structure of such locking member 10 is described in the post-published patent application DE 103 16 230.

The conical valve seat 14 is in the form of a radial shoulder of a valve bore 22 in which the locking member 10 is guided to be axially movable. Said valve bore 22 on the one hand opens into the port A and, on the other hand, into the outlet passage 8 of the counter-plate 4. The valve bore 22 is extended toward the outlet passage 8 via a bearing shoulder 24. In the extended area a sealing bush 26 is inserted which is tightly adjacent to the circumferential wall of the valve bore 22 with its outer circumference and is supported with its front end face 28 at the bottom in FIG. 1 on the bearing shoulder 24 and with its rear end face 30 (at the top in FIG. 1) on the counter-plate 4. In the shown embodiment the outer diameter and the axial length of the sealing bush 26 are formed somewhat larger than the diameter of the axially extended portion of the valve bore 22 and, respectively, the axial distance between the contacting surface of the counter-plate 4 and the bearing shoulder 24 so that the sealing bush 26 is inserted with press-fit.

In the shown embodiment the sealing bush 26 acts as valve retainer, wherein a spring 32 biasing the locking member 10 against the valve seat 14 is supported on a radial shoulder 34 of a sealing bush bore 36.

Figure 2:
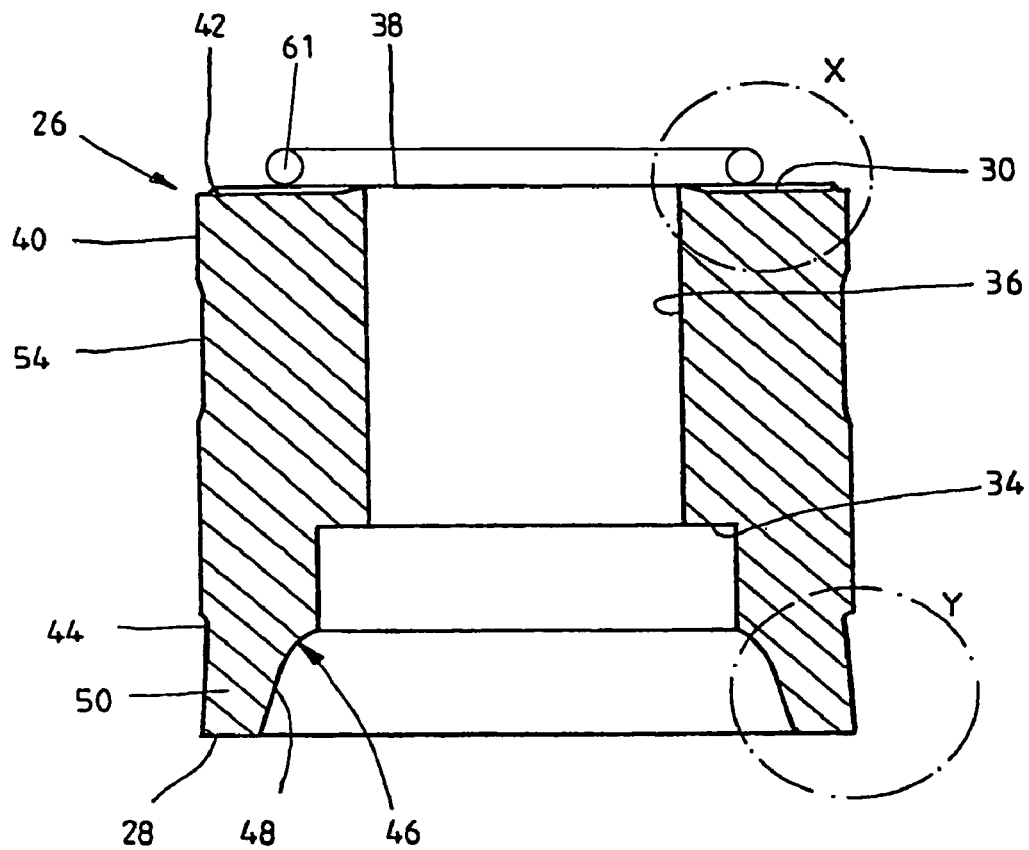
FIG. 2 is a sectional representation of a sealing bush of the hydraulic unit from FIG. 1.
Figure 3:
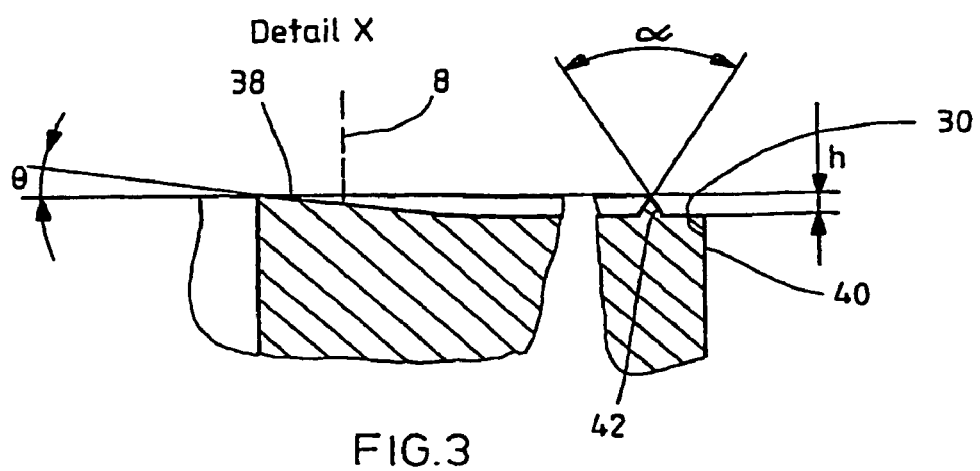
FIG. 3 shows a detail X of the sealing bush.
Figure 4:
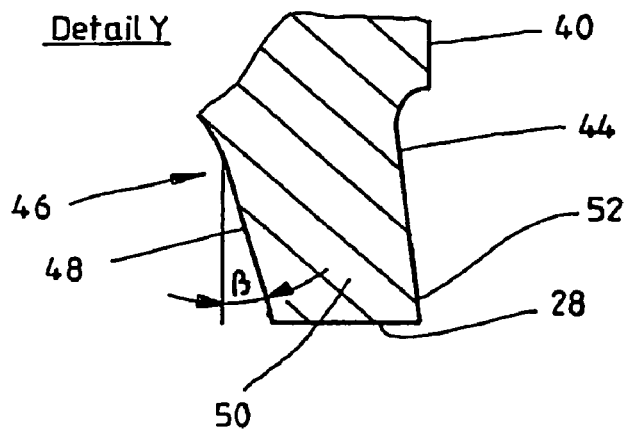
FIG. 4 shows a detail Y of the sealing bush.

Further details of the sealing bush 26 are illustrated by way of the representation according to FIGS. 2 to 4. FIG. 2 shows an enlarged sectional representation of the sealing bush 26 used in the embodiment according to FIG. 2. In accordance with FIG. 2 and the detail X, at the rear end face 30 a frusto-conical elevation 38 is formed into which the sealing bush bore 36 opens. As one can take especially from the detail X (FIG. 3), the elevation 38 shallows out at a distance from the outer circumference 40 of the sealing bush 26 in the end face 30, the conical angle θ amounts to approx. 8° in the shown embodiment. Accordingly, the elevation 38 extends in radial direction about one third over the annular front face which is delimited by the outer circumference 40 and the sealing bush bore 36. The sealing bush 26 is adjacent to the counter-plate 4 by the elevation 38, the diameter of the outlet passage 8 and the dimensions of the elevation 38 being selected such that the elevation 38 somewhat immerses in the outlet passage 8 and thus the opening circumferential edge thereof (broken line in FIG. 3) is seated on the conical surface. By this design a reliable sealing is ensured at the front side by means of the sealing bush 26.

In order to improve the sealing, in the shown embodiment a circumferential sealing rib 42 whose height h is equal to the height of the elevation is formed at a distance from the shallowing area of the elevation 38 and from the outer circumference 40. The nose angle α of the sealing rib 42 is approx. 60° in the shown embodiment. In the mounted state the latter is equally adjacent to the facing large surface of the counter-plate 4 and in this way forms an additional sealing.

In accordance with the detail Y from FIG. 2 illustrated in FIG. 4, at the outer circumference 40 of the sealing bush 26 in the area of the front end face 28 a circumferential recess 44 is formed which starts at the circumferential edge delimiting the front end face 28 and gradually deepens to the rear, i.e. away from the front end face 28.

According to FIG. 2, the front portion (at the bottom in FIG. 2) of the sealing bush bore 36 radially extended by the radial shoulder 34 opens via an internal recess 46 whose circumferential wall opens into the front end face 28 via a conical portion 48. By the recess 44 deepening to the rear and the conical portion 48 the front portion of the shell of the sealing bush 26 is tapered so that a sealing lip 50 is formed which is tightly adjacent to the inner circumferential wall of the valve bore 22 by a circumferential area 52 (FIG. 4). The taper angle β of the conical portion 48 is approx. 15° in the shown embodiment. The compressive force acting inside the sealing bush 26 is split, corresponding to said taper angle, into an axial component and a radial component by which the sealing lip 50 is outwardly pressurized in radial direction and by which the sealing bush 26 is additionally pressed against the counter-plate 4 in axial direction. I.e. in the shown embodiment the sealing bush 26 is deliberately designed to have certain elasticity in the area of the sealing lip 50 so as to increase the sealing effect.

In the embodiment represented in FIG. 2 of the sealing bush an annular groove 54 is formed at an axial distance from the recess 44. Said annular groove 54 contributes to the fact that upon shrinking the dimensional stability of the areas of the sealing bush adjacent to the inner circumferential wall of the valve bore 22 is influenced only slightly. Moreover also the seal tightness of the outer circumference is improved.

Figure 5:
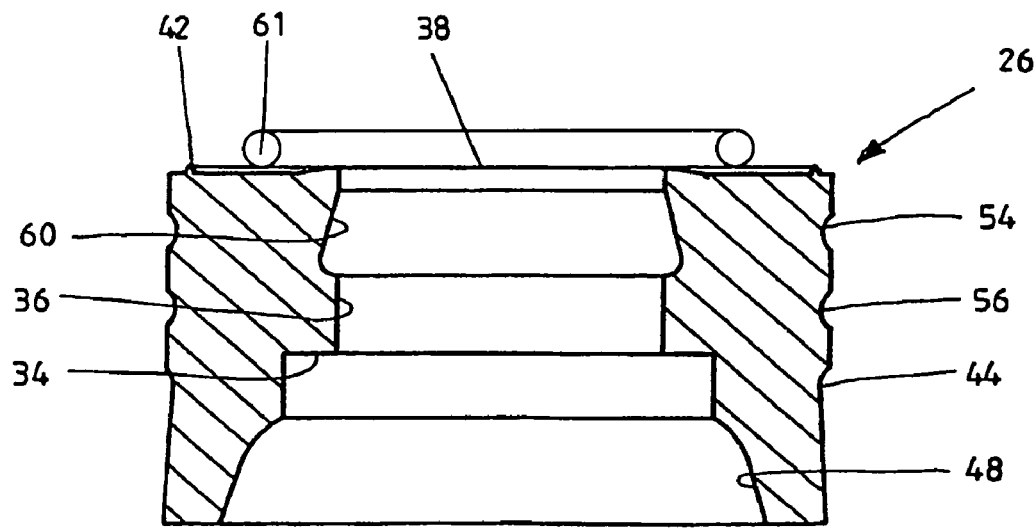
FIG. 5 shows a further embodiment of a sealing bush.

FIG. 5 shows a further embodiment of a sealing bush 26 as is can be used in a hydraulic unit 5 according to FIG. 1. The configuration of the frusto-conical elevation 38, the sealing rib 42, the recess 44 and the conical portion 48 is substantially selected as in the afore-described embodiment so that further respective explanations are dispensable. The embodiment shown in FIG. 5 substantially differs from the afore-described embodiment by the fact that at the outer circumference instead of one single comparatively large-area annular groove 54 two annular grooves 54, 56 in cross-section in the shape of a circle segment are formed so that an additional sealing point is formed at the outer circumference.

It is another difference that in the rear portion of the sealing bush bore 36 radially stepped back by the radial shoulder 34 a circumferential recess 60 is formed which at first relatively quickly increases in depth and upon reaching a vertex gradually increases toward the elevation 38. The function of this recess 60 is substantially equal to that of the recess 44—in the area of the elevation 38 deliberately a weakening of the material is brought about by which an elasticity is imparted to the contact area of the elevation 38 with the counter-plate 4 by which it is ensured that the sealing bush 26 can be tightly biased in axial direction against the counter-plate 4. Said bias is caused by the axial and radial oversize of the sealing bush 26—as in the afore-described embodiment.

The angle of attack of the longer flank of the recess 60 ascending toward the elevation 38 is in the shown embodiment about 12°, the respective angle of attack of the recess 44 is somewhat smaller and is approx. 2°.

Both above-described sealing bushes 26 are made of plastic in an injection molding process and consist of a comparatively wear-resistant plastic, for instance PEEK or POM.

The front side sealing of the sealing bush 26 can be improved if an additional sealing ring 61 which is then adjacent to the counter-plate 40 on the front face is arranged in the area between the elevation 38 and the sealing rib 42 at the rear end face 30. The sealing ring 61 can be supported at a bore in an end face of the counter-plate 4. In this context, a counter-plate 4 having a through outlet passage 8 can be used which opens with its cross-section at an end face of the counter-plate (cf. FIG. 1). On the other side of the end face the counter-plate 4 includes the bore for receiving the sealing ring 61. The counter-plate 4 is mounted depending on the application purpose either as in the case of FIG. 1 or pointing with the bore toward the plate 2. In the latter case, additionally a sealing ring 61 which is tightly adjacent to the plate 2 can be employed.

Of course, instead of the above-described geometries, especially the taper angles, also other dimensions can be used, as long as the sealing function in the axial and/or radial direction is not deteriorated. The hydraulic fluid flow passage receiving the sealing bush 26 can also be in the form of a housing bore (without plates).

There is disclosed a sealing bush as well as a hydraulic unit fitted with the sealing bush and a check valve. The sealing bush is made of plastic and has, on an end face, a preferably conical elevation that can be brought into sealing contact with a bearing shoulder.

LIST OF REFERENCE NUMERALS

1 Mobile control block
2 plate
4 counter-plate
6 check valve 8 outlet passage
10 locking member
12 cone
14 valve seat
16 internal bore
18 inclined bore
20 annular chamber
22 valve bore
24 bearing shoulder
26 sealing bush
28 front end fare
30 rear end face
32 spring
34 radial shoulder
36 sealing bush bore
38 elevation
40 outer circumference
42 sealing rib
44 recess
46 inner recess
48 conical portion
50 sealing lip
52 sealing circumferential edge
54 annular groove
56 annular groove
58 inner circumferential groove
60 recess
61 sealing ring

The invention claimed is:

1. A sealing bush for being inserted in a hydraulic fluid flow passage at an outer circumference of which sealing means are provided, the sealing bush comprising:
   an annular plastic sealing bush member having an outer circumference, an inner circumference and a rear end face; and
   an elevation formed on the rear end face and projecting in an axial direction of the sealing bush member, wherein
   the elevation is configured to be in sealing contact with a shoulder of the hydraulic fluid flow passage,
   the elevation is formed in an area of the inner circumference at the rear end face of the sealing bush member,
   the elevation in the rear end face decreases in height in the axial direction as the elevation extends from the inner circumference toward the outer circumference on the rear end face,
   the elevation is configured to sealingly receive an opening circumferential edge defined by the shoulder,
   the elevation has a frusto-conical shape and increases in axial height toward the inner circumference, and
   the frusto-conical elevation forms a taper tapered angle within the range of from 8° to 10° with the rear end face.

2. The sealing bush according to claim 1, wherein the elevation extends in a radial direction approximately over one third of a difference in diameters of the outer and inner circumferences.

3. The sealing bush according to claim 1, further comprising a circumferential sealing rib formed in an area between the elevation and the outer circumference at the rear end face.

4. The sealing bush according to claim 3, wherein in the axial direction, the sealing rib has a same height as the elevation.

5. The sealing bush according to claim 1, further comprising a sealing lip formed at the outer circumference of the sealing bush member in an area of a front end face, and the sealing lip is formed by a recess at the outer circumference becoming deeper toward the rear end face.

6. The sealing bush according to claim 5, further comprising at least one annular groove formed at the outer circumference at an axial distance from the recess.

7. The sealing bush according to claim 1, wherein an inner circumferential wall extends toward a front end face so that compressive forces act in the axial direction and a radial direction.

8. The sealing bush according to claim 1, further comprising a circumferential recess which shallows out toward the rear end face formed at the inner circumferential wall in a vicinity of the rear end face.

9. A check valve comprising a locking member which is biased against a valve seat via a spring supported on a sealing bush, the sealing bush is configured to be inserted in a hydraulic fluid flow passage at an outer circumference of which sealing means are provided, the sealing bush comprising:
   an annular plastic sealing bush member having an outer circumference, an inner circumference and a rear end face; and
   an elevation formed on the rear end face and projecting in an axial direction of the sealing bush member, wherein
   the elevation is configured to be in sealing contact with a shoulder of the hydraulic fluid flow passage,
   the elevation is formed in an area of the inner circumference at the rear end face of the sealing bush member,
   the elevation in the rear end face decreases in height in the axial direction as the elevation extends from the inner circumference toward the outer circumference on the rear end face, and
   the elevation is configured to sealingly receive an opening circumferential edge defined by the shoulder.

10. The check valve according to claim 9, wherein the locking member is made of plastic.

11. The check valve according to claim 9 further comprising:
   a hydraulic fluid flow passage in which the sealing bush member is inserted with radial and axial oversize.

* * * * *